United States Patent [19]

Mengo, Sr.

[11] 4,093,171

[45] June 6, 1978

[54] FISHING-ROD HOLDER

[76] Inventor: Alfred Mengo, Sr., 4302-83rd St., Kenosha, Wis. 53140

[21] Appl. No.: 734,619

[22] Filed: Oct. 21, 1976

[51] Int. Cl.² .......................................... A01K 97/10
[52] U.S. Cl. .................................. 248/515; 248/314; 403/113
[58] Field of Search ............... 248/478, 514, 515, 517; 403/118, 113

[56] References Cited

U.S. PATENT DOCUMENTS

| 2,918,237 | 12/1959 | Boesch | 248/517 |
| 3,010,687 | 11/1961 | Hagberg | 248/515 |
| 3,319,911 | 5/1967 | Fuller | 248/514 |
| 3,384,334 | 5/1968 | Malachowski | 248/478 |
| 3,628,759 | 12/1971 | Knedlik | 248/515 |

Primary Examiner—William H. Schultz
Attorney, Agent, or Firm—Axel H. Johnson

[57] ABSTRACT

A fishing-rod holder to be mounted upon the hull of a boat or other support, comprising an upwardly-directed tubular member into which a fishing rod can be inserted. The tubular member is mounted on a bracket so as to swivel at various angles vertically, and which bracket is pivotally mounted upon a base to permit directing the rod at various lateral positions.

1 Claim, 5 Drawing Figures

U.S. Patent  June 6, 1978  Sheet 1 of 2  4,093,171
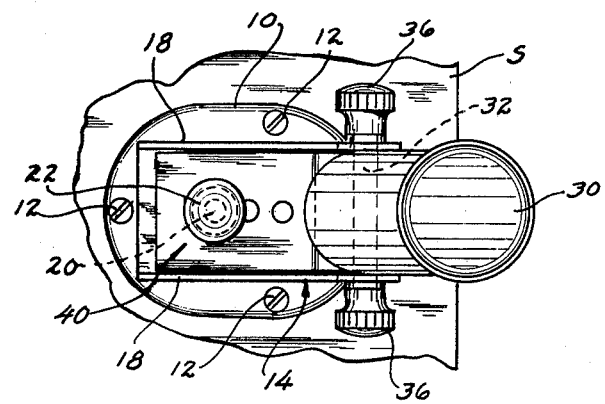
FIG. 3
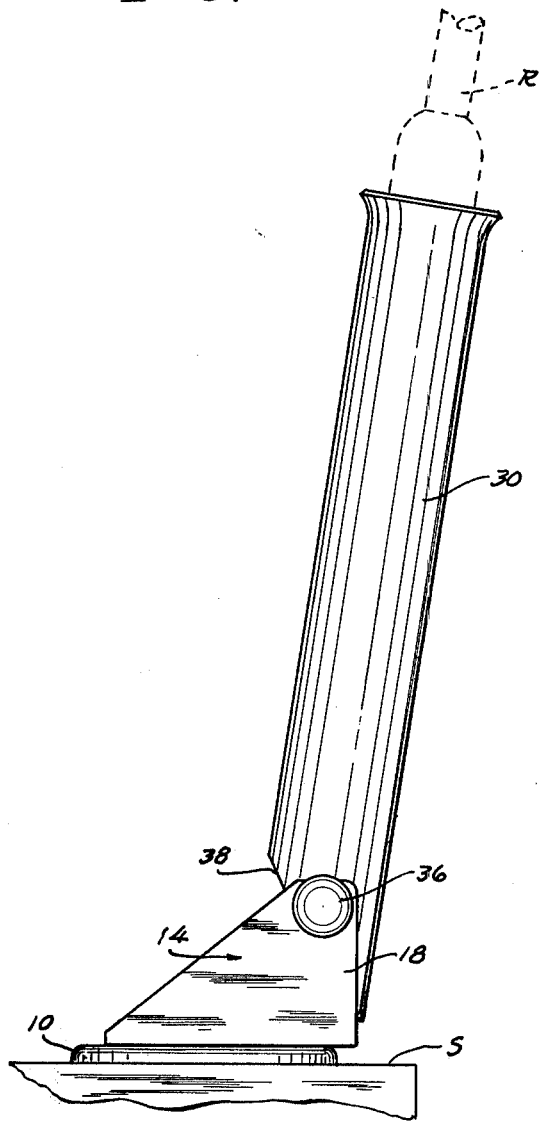
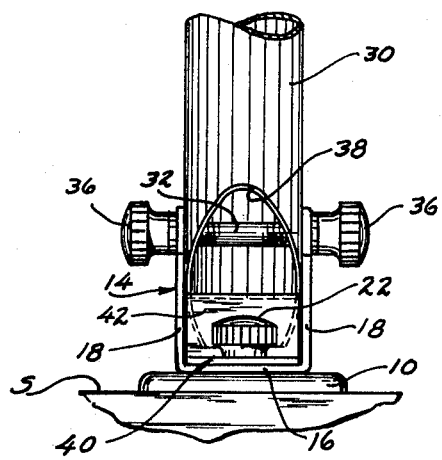
FIG. 2  FIG. 1

FISHING-ROD HOLDER

BACKGROUND OF THE INVENTION

1. Field of the Invention.

This invention relates to a means of supporting a fishing rod on the hull of a boat or other support, so as to free the fisherman of the task of holding the rod manually.

2. Description of the Prior Art.

The prior art embraces fishing-rod holders of various designs; one in particular employing a foot pedal to control the position of the rod.

SUMMARY OF THE INVENTION

This invention, generally, concerns a means of supporting a fishing rod on a boat hull or other fixed support. An object of this invention being to relieve the fisherman of the task of manually holding the rod and to also permit him to tend several rods simultaneously.

Referring to the drawings:

FIG. 1 is a vertical side view of the rod holder in the normal upright position and showing a rod in dotted lines.

FIG. 2 is a projection of a portion of FIG. 1.

FIG. 3 is a projection of FIG. 1.

Referring again to the drawings:

The rod holder embraced in this invention is shown secured to a fixed surface S, and comprises a base 10 formed as shown, and being secured to the supporting surface S by conventional screws 12, or by other suitable means.

Figure 5:
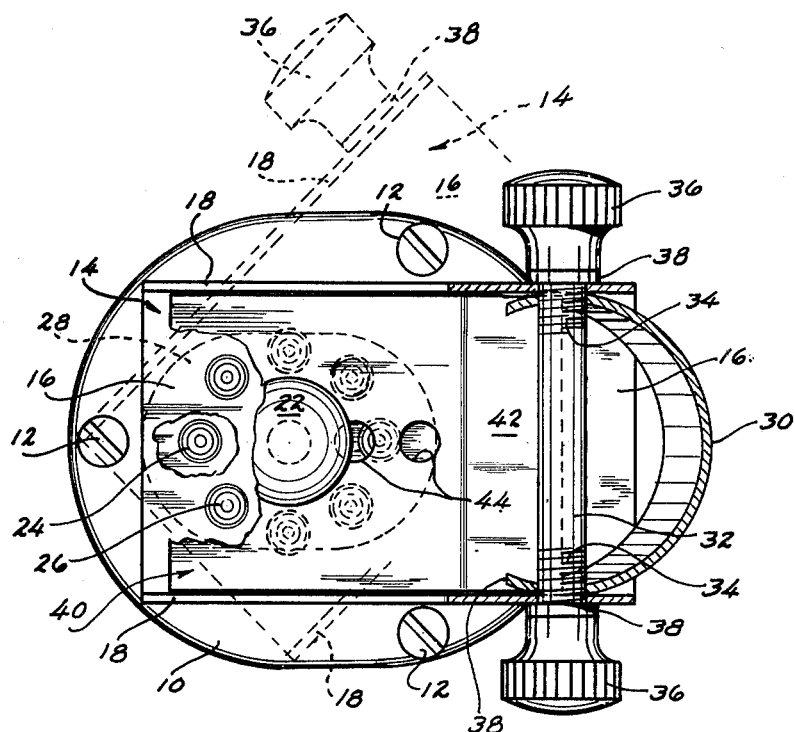
FIG. 5 is a view taken at 5—5 of FIG. 4.

A bracket 14 comprising a panel 16 and laterally-spaced upright walls 18, is positioned with the panel 16 in contact with the surface of base 10. Bracket 14 is rotatably secured to base 10 and pivots about the axis of threaded member 20 which has a knob 22. A plurality of "dimples" 24, eight in this instance, are provided in the surface of base 10 and shown in FIGS. 4 and 5 on a circle having its axis common with that of threaded member 20. Similar "dimples" 26 are are provided in panel 16 positioned about the common axis of threaded member 20, resulting in an indexing co-operation between the "dimples" 24 and 26, permitting bracket 14 to be indexed at selective angular positions relative to base 10.

A nut member 28 is threaded to receive the threaded member 20, and which nut abuts the "dimples" on the lower surface of base 10. When the desired angular position of bracket 14 has been selected, knob 22 is tightened so as to secure the bracket 14 integrally to base 10.

Tubular member 30 is of a suitable length and diameter to adequately support a rod R, which rod is indicated by dotted lines in FIG. 1. The upper end of member 30 is flared outwardly to avoid injury to the rod caused by contact of the latter with the edge of the tubular member. Tubular member 30 is of a diameter substantially tangent with the inner surfaces of walls 18. Pivotal support for tubular member 30 relative to walls 18 comprises a shaft 32 which passes through openings in the member 30 and walls 18. Shaft 32 is threaded at the ends thereof as at 34. Knobs 36 are threaded so as to engage the thread of shaft 32. Knobs 36 are tightened so as to secure tubular member 30 in position. Washers 38 are assembled intermediate walls 18 and knobs 36. The lower end of tubular member 30 terminates in an edge defined by a plane angularly directed relative to the axis of the tubular member, and indicated as 39.

Figure 4:
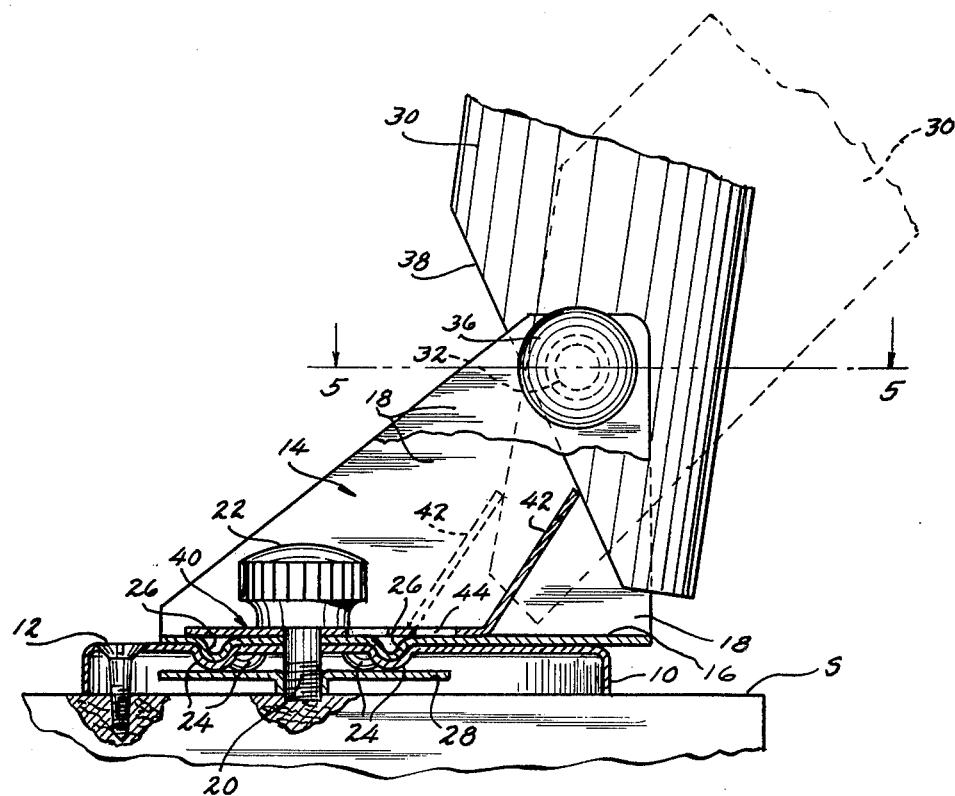
FIG. 4 is an enlargement of a portion of FIG. 1, with parts broken away to show details more clearly, and with the tubular member also shown in the extreme lower position by dotted lines.

A stop member 40 having an upwardly-directed tongue 42 to engage the end 39 of tubular member 30, is slidably supported on the upper surface of panel 16. Openings 44 are provided in stop member 40; the one to receive the threaded member 20 determines the angular position of the tubular member 30. Dotted lines in FIG. 4 show one of the positions of the tubular member 30 determined by the positioning of the stop member 40.

The above being a complete description of an illustrative embodiment of the invention, what is claimed as new and desired to be secured by Letters Patent of the United States is:

1. A holder for supporting a fishing rod, comprising a base, a bracket having a panel pivotally secured to said base, and upwardly-extending spaced walls integral with said panel, a tubular member intermediate said walls, pivot means to support said tubular member relative to said walls, said tubular member conforming at the lower end thereof to a plane angularly directed relative to the axis of said tubular member, and a stop member slidably-secured to said panel, said stop member being slidably guided intermediate said walls and having an upwardly-directed tongue to engage said plane of said tubular member.

* * * * *